United States Patent [19]

Naito et al.

[11] Patent Number: 5,038,879
[45] Date of Patent: Aug. 13, 1991

[54] FAIL-SAFE DEVICE FOR MOTOR VEHICLE SPEED GOVERNOR

[75] Inventors: Yasuo Naito; Akihiko Mori; Kazuyori Katayama; Hiroyuki Kouzuki, all of Hyogo, Japan

[73] Assignee: Mitsubishi Denki Kabushiki Kaisha, Tokyo, Japan

[21] Appl. No.: 452,086

[22] Filed: Dec. 18, 1989

[30] Foreign Application Priority Data

Dec. 23, 1988 [JP] Japan .............................. 63-0327130
Dec. 24, 1988 [JP] Japan .............................. 63-327075
Dec. 24, 1988 [JP] Japan .............................. 63-327076

[51] Int. Cl.⁵ .............................................. B60K 31/04
[52] U.S. Cl. ...................................... 180/179; 123/352; 364/431.11
[58] Field of Search ............... 364/431.11; 123/352, 123/396; 180/170, 177, 179

[56] References Cited

U.S. PATENT DOCUMENTS 3,916,865 11/1975 Kiencke et al. ..................... 123/352
4,313,351  2/1982 Mann et al. ........................ 180/179
4,345,663  8/1982 Shields .............................. 180/179
4,410,398 10/1983 Higashiyama ................... 364/431.11
4,540,060  9/1985 Kawata et al. .................... 180/179
4,747,460  5/1988 Tomoshige et al. ............... 180/177

Primary Examiner—Andres Kashnikow
Assistant Examiner—Eric Culbreth
Attorney, Agent, or Firm—Sughrue, Mion, Zinn, Macpeak and Seas

[57] ABSTRACT

An improved fail-safe device for a motor vehicle speed governor of the type having a control system to switch a supply of power to an actuator ON and OFF for the control of the traveling speed of a motor vehicle to keep a constant speed. A latch is connected to power supply control circuit which controls the power supply to an actuator. The actuator actuates a throttle valve in an intake manifold of an engine for providing constant speed travel by turning the throttle valve ON and OFF in accordance with an output of the latch. The latch is set with a command signal and reset with a cancel signal or a reset signal. The resetting of the latch is executed if an absence of a watch dog signal is detected or a change of output generating status of the latch is detected under certain conditions. The state of the latch can be maintained if the conduction of a switching circuit for the actuator is detected regardless of a command signal to start up the constant speed traveling.

12 Claims, 8 Drawing Sheets

FAIL-SAFE DEVICE FOR MOTOR VEHICLE SPEED GOVERNOR

BACKGROUND OF THE INVENTION

1. Field of the Invention

The present invention relates to a fail-safe device for a motor vehicle and, more particularly to improvements in a fail-safe device for a motor vehicle speed governor of the type having a control system to switch a supply of power to an actuator ON and OFF to control the traveling speed of a motor vehicle to keep a constant speed.

2. Description of the prior art

Heretofore, a microcomputer has been used to control an actuator which drives a throttle valve in an intake manifold of an engine for providing a constant traveling speed of a motor vehicle. One of such computerized prior art throttle valve actuators with a microcomputer is shown in FIG. 1, wherein the microcomputer 17 generates a series of pulse signals having a predetermined repetition rate as a watch dog signal. This watch dog signal is differentiated at a watch dog signal processor 4. The differentiated signal is then rectified to cut off the negative polarity pulses and reverse the polarity thereof at the watch dog signal processor 4. This reversed signal is integrated at a reset signal generator 5. An amount of the integrated signal is brought substantially to 0 level, if a refresh signal is included which makes the reversed signal "0" level instantaneously synchronized with the rise time of the watch dog signal.

The value of the integrated signal is compared with a predetermined level at the reset signal generator 5 and if it is at or below the predetermined level, the watch dog signal is considered to be generated normally at the microcomputer 17 and the system remains as it is. However, if the value of the integrated signal exceeds the predetermined level for lack of the refresh signal, the reset signal generator 5 generates a reset signal since the microcomputer 17 is considered to be out of order because the watch dog signal is not generated properly at the microcomputer 17. The operation of the microcomputer 17 is then halted due to the reset by the reset signal for the initialization thereof.

In accordance with the prior art fail-safe device for the motor vehicle speed governor there is a possibility of no resetting of the microcomputer 17 even if a reset signal is generated under such conditions as an output of the watch dog signal ceasing and, worst of all, the generated signal for controlling the throttle valve to open remains as is which causes unfavorable problems in the safety of motor vehicle traveling.

Another prior art computerized fail-safe device for a motor vehicle speed governor is shown in FIG. 2. In this type of fail-safe device, a D flip-flop circuit (hereinafter called D.F.F.) 7 is provided as a latch circuit in addition to the microcomputer 17. The power supply to the actuator which controls the opening of the throttle valve for constant speed traveling is controlled in an ON/OFF manner in accordance with the output status of the D.F.F. 7. In operation, the D.F.F. 7 is set by a command signal for instructing the commencement of the constant speed traveling and is reset by a cancel signal for instructing the end of the constant speed traveling. The command signal and the cancel signal have been fed to the D.F.F. 7 from a command signal input means 2 and a cancel signal input means 3 being provided separately from the microcomputer 17. The power supply to the actuator is brought to ON when the D.F.F. 7 is set and to OFF when the D.F.F. 7 is reset. More specifically, the motor vehicle speed governor is not under operation in a normal traveling condition and the D.F.F. 7 is in the reset position or a canceled status. Therefore, a Q terminal of the D.F.F. 7 remains at a low "L" level and both transistors 9 and 12 are OFF for disconnecting first and second solenoid valve coils 13a and 14a from a power source 11. Afterwards, upon generation of a command signal from the command signal input means 2 by the operation of a driver the D.F.F. 7 receives the command signal at a CL terminal (i.e., clock terminal) for setting and the Q terminal is set to the "H" level since a D terminal thereof has been pulled up to a high "H" level. This turns on transistor 9 and transistor 12. Hence, the first and the second solenoid valve coils 13a and 14a are connected to the power supply 11 by the conduction of the transistor 12.

On the other hand, the microcomputer 17 is brought into operation to control the traveling speed of the motor vehicle upon receipt of the command signal from the command signal input means 2 and controls the ON/OFF state of the transistors 15 and 16 in accordance with an input signal from a speed signal generating means 1. The first solenoid valve coil 13a is energized when the transistor 15 is turned ON and the second solenoid valve coil 14a is energized when the transistor 16 is turned ON. Thereby, constant speed travel of the motor vehicle is provided by adjusting the opening of the throttle valve in accordance with the ON/OFF status of the first and the second solenoid valves 13 and 14.

In FIG. 3, a schematic diagram of the prior art actuator and throttle valve illustrating the structure and the relationship thereof is shown. Numeral 22 denotes an actuator consisting of solenoid valves 13, 14 and a vacuum diaphragm actuator 23 for controlling the opening and the closing of a throttle valve 25 provided at an intake manifold 24 of an engine during constant speed travel. The vacuum diaphragm actuator 23 comprises a housing 23b which defines an air chamber 23a vented to an input pipe 13b of the solenoid valve 13 an output pipe of which is connected to a negative pressure source of the engine and also vented to an output pipe of the solenoid valve 14 an input pipe of which is open to the atmospheric pressure, a diaphragm member 23c, a rod 23d for linking the throttle valve 25 and the diaphragm member 23c, and a spring member 23e interposed between the diaphragm member 23c and the housing 23b for pushing the diaphragm member 23c from the air chamber 23a side.

The operational conditions will be given by the following chart.

| Operational mode | 1st solenoid (13) | 2nd solenoid (14) | throttle valve (25) |
|---|---|---|---|
| acceleration | ON | ON | OPEN |
| deceleration | OFF | OFF | CLOSE |
| hold | OFF | ON | CONSTANT |

A cancel signal with a high "H" level is generated at the cancel signal input means 3 upon operation of the driver and is fed to the D.F.F. 7 at an R terminal for resetting the D.F.F. 7 since an S terminal thereof is grounded to a low "L" level. With this resetting, the Q terminal is brought to a low "L" level and the system is recovered to the normal condition for disconnecting the first and second solenoid coils 13a and 14a from the power source 11. The microcomputer 17 cancels the setting of the constant speed travel upon receipt of the canceling signal for halting control for the constant speed travel and stands by for a next command.

In this type of prior art speed governor, there is a danger of locking up the output signal which renders transistors 15 and 16 ON in case microcomputer 17 is in a runaway mode due to external noises or is malfunctioning. Further, the transistor 12 may be turned off if a cancel signal is derived from the cancel signal input means 3 and the D.F.F. 7 is reset therewith. However there is a problem for the safety of motor vehicle travel in the prior art speed governor. That is if a command signal is generated at the command signal input means 3 and the D.F.F. 7 is brought to the set condition upon receipt thereof, the first and second solenoid valves 13, 14 are energized and remain at the energized ON condition.

Still further accidental shortages between collectors and emitters of the transistors 15 and 16 may cause the same type of problem as described above in the prior art system.

As for the prior art fail-safe device for a motor vehicle speed governor, since an output of the D.F.F. 7 has not been monitored by the microcomputer 17, the control of the microcomputer 17 may differ from the output of the D.F.F. 7., if the D.F.F. 7 is rendered to erroneous operation because of external noises. Thus, the duplicate system for fail-safe operation does not effectively operate and has resulted in a lack of safety of motor vehicle travel.

It is, therefore, an object of this invention to provide a fail-safe device for a motor vehicle speed governor that can assure safety in travel by turning OFF a power supply to an actuator when a reset signal is generated due to the ceasing of the watch dog signal.

It is another object of this invention to provide a fail-safe device for a motor vehicle speed governor that can keep a power supply from providing power to an actuator when the malfunction or the runaway of the constant speed travel system has occurred, or the malfunction of switching elements for driving the actuator has occurred.

It is still another object of this invention to provide a fail safe device for a motor vehicle speed governor that can assure the safety of the traveling of a motor vehicle by normalizing an output of a latch through monitoring the output thereof.

SUMMARY OF THE INVENTION

According to the present invention an improved fail-safe device for a motor vehicle speed governor is provided. The fail-safe device in accordance with the present invention comprises command signal input means, cancel signal input means, watch dog signal generator means reset means for deriving a reset signal therefrom after detecting the ceasing of the watch dog signal output, and power supply control means for controlling the ON/OFF supply of power to an actuator and turning the power supply OFF upon receipt of the reset signal.

More specifically, in accordance with the present invention, a fail-safe device is provided for a motor vehicle speed governor wherein the power supply control means controls the power supply to the actuator to turn the actuator OFF when a reset signal from the reset means is received at an input thereof for terminating the operation of the actuator.

According to a specific embodiment of the present invention, a fail-safe device is provided for a motor vehicle speed governor detector means are provided for detecting the conduction of switching elements which control the actuator, and the power supply control means controls the power supply to the actuator to turn it OFF when the signal detected at the detecting means is received at the input thereof in a period of canceling regardless of an input from the command input means.

According to another specific embodiment of the present invention, a fail-safe device is provided for a motor vehicle speed governor wherein the power supply to the actuator is controlled to be turned OFF by the power supply control means in terms of safety, even if a command signal is received at the input thereof when the shortage caused by a failure of the switching elements or the conduction of the switching elements caused by a malfunction of the control system and the like is detected by the detecting means under a period of canceling.

According to another specific embodiment of the present invention, a fail-safe device for a motor vehicle speed governor comprises detector means for detecting a second output generating status of the latch means which is for controlling the power supply to the actuator to turn it OFF and reset means for generating a reset signal which renders the latch means to the second output generating status in the duration defined by the input of a cancel signal to the input of the detected signal.

According to another specific embodiment of the present invention, a fail-safe device for a motor vehicle speed governor comprises detecting means for detecting a first output generating status of the latch means which is for controlling the power supply to the actuator to turn it ON and reset means for generating a reset signal to render the latch means to the second output generating status for controlling the power supply to the actuator to turn it OFF when the detected signal is received under the condition of no command signal being generated.

According to another specific embodiment of the present invention, a fail-safe device is provided for a motor vehicle speed governor, wherein the reset means continues to output a reset signal until the latch means is brought to the second output generating status if the latch means is not rendered to the second output generating status when the canceling signal is generated.

According to still another specific embodiment of the present invention, a fail-safe device is provided for a motor vehicle speed governor wherein the reset means derives a reset signal therefrom for bringing the latch means to the second output generating status and turning OFF the power supply to the actuator under such circumstances as the power supply to the actuator being accidentally turned ON by the change of the latch means to the first output generating status in spite of lacking a command signal.

DESCRIPTION OF THE PREFERRED EMBODIMENTS

Figure 1:
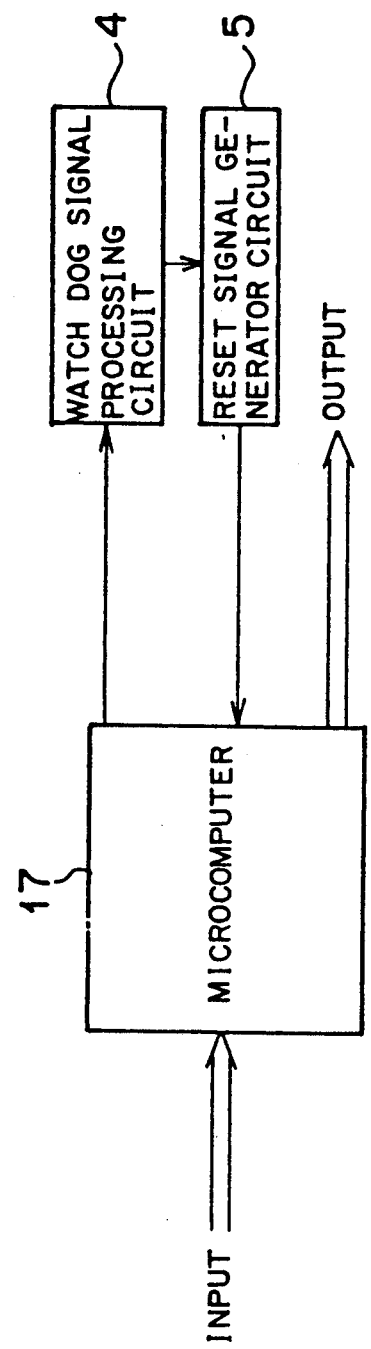
FIG. 1 is a block diagram showing a prior art fail-safe device for a motor vehicle speed governor
Figure 2:
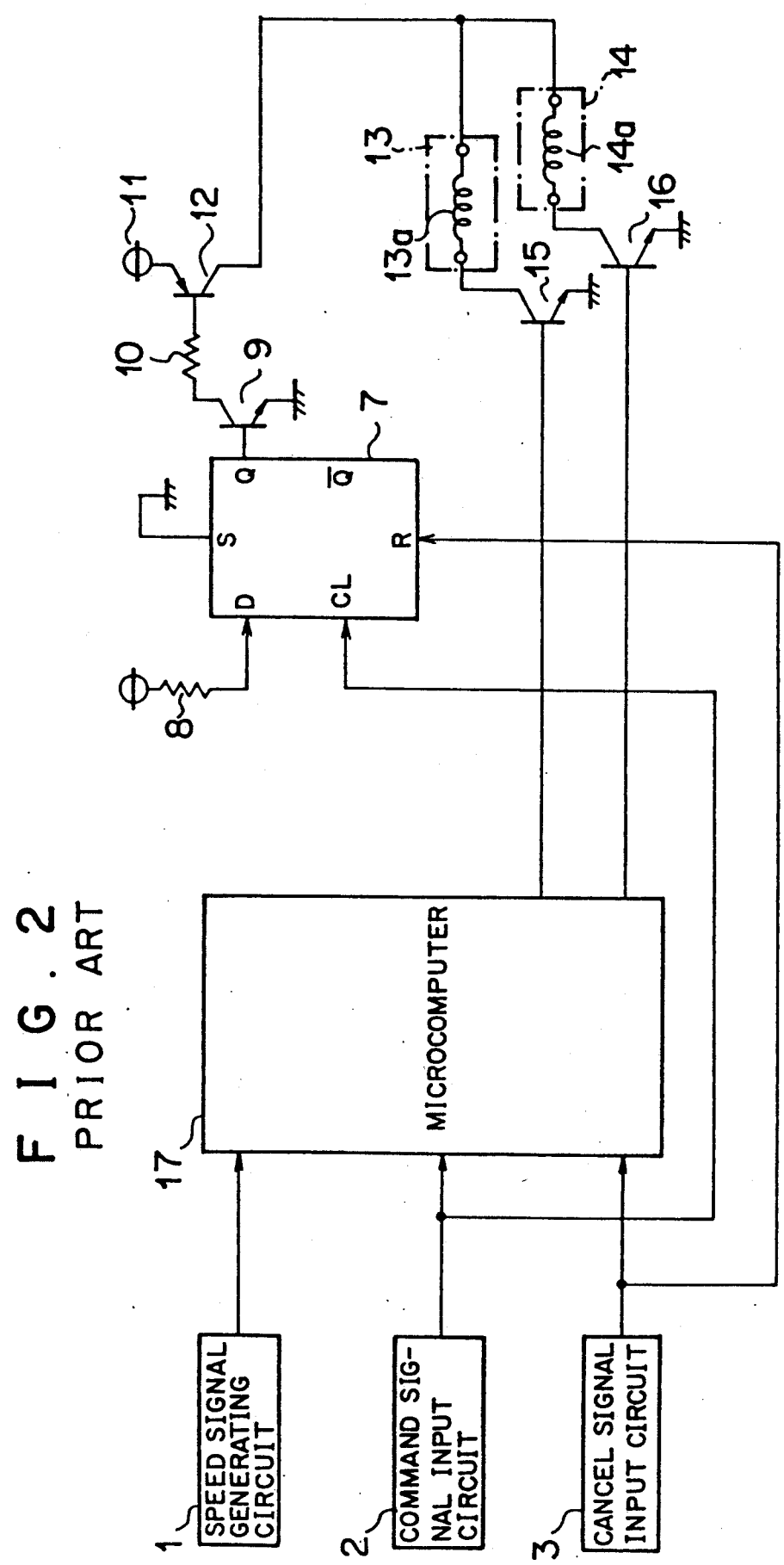
FIG. 2 is a block diagram showing another prior art fail-safe device for a motor vehicle speed governor.
Figure 3:
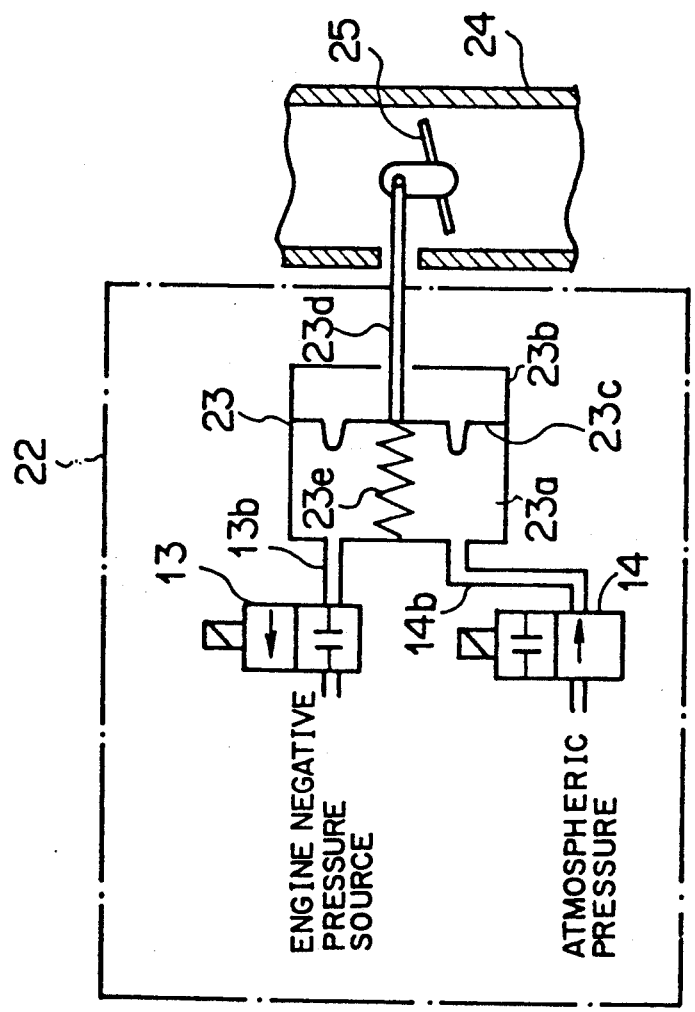
FIG. 3 is a vertical cross-sectional view of an actuator and a throttle valve well known in the art illustrating the relationship therebetween.
Figure 4:
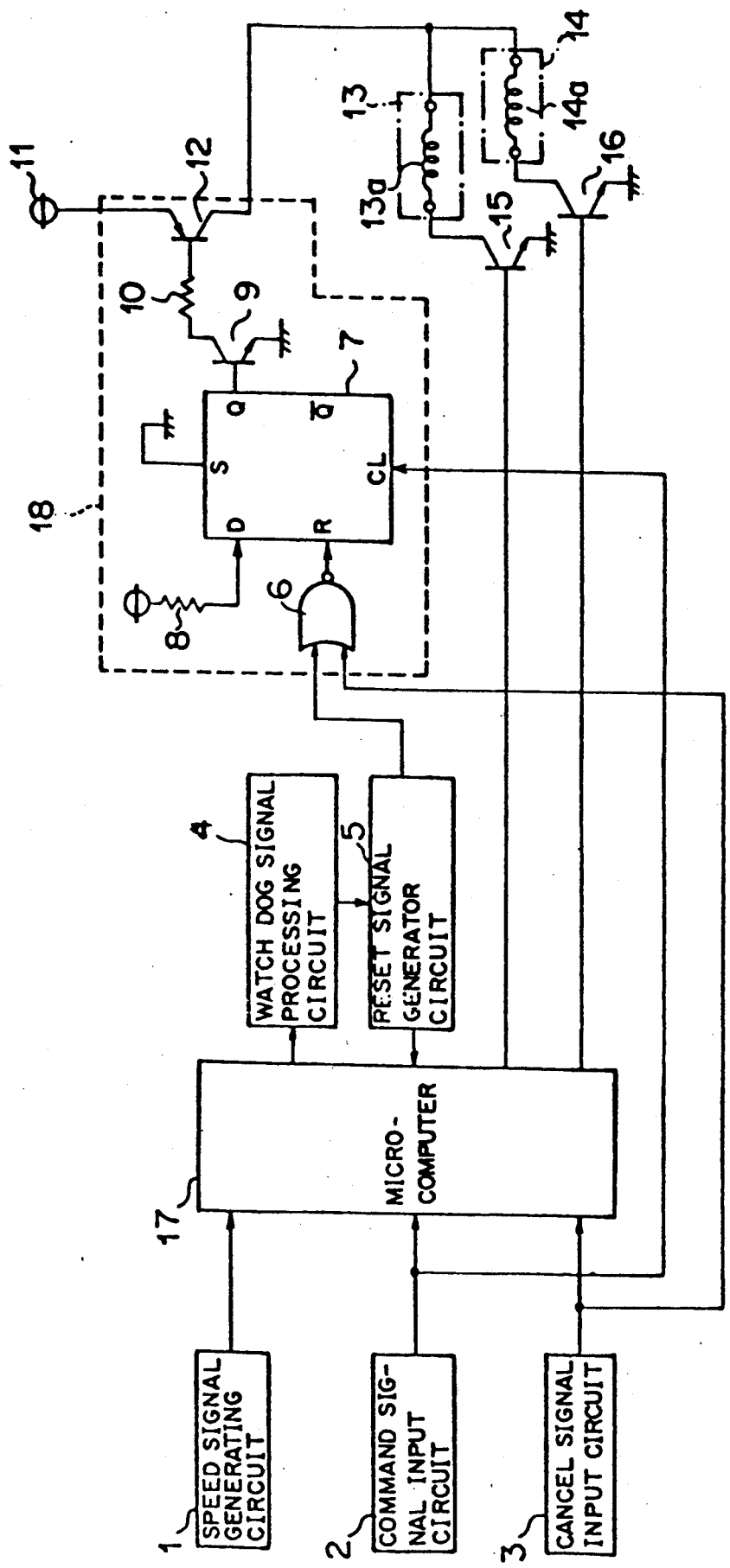
FIG. 4 is a block diagram showing a fail-safe device for a motor vehicle speed governor in accordance with an embodiment of this invention.

The present invention will now be described in greater detail with reference to the accompanying drawings, in the several figures of which, like reference numerals identify like elements. Referring now to FIG. 4, a block diagram of a motor vehicle speed governor is illustrated with the fail safe device embodying the present invention, wherein a speed signal generator circuit 1 generates a signal having a frequency that corresponds to a traveling speed of a motor vehicle, a command signal input circuit 2 generates a command signal to direct the constant speed traveling by the operation from the outside, and a cancel signal input circuit 3 generates a cancel signal to direct the cancellation of the constant speed travel by operation from the outside. A watch dog signal processing circuit 4 receives a watch dog signal and processes it into a signal that confirms to the integration and a reset signal generator circuit 5 derives a reset signal therefrom when an integrated value given by integrating an output of the watch dog signal processing circuit 4 exceeds a predetermined level after comparison therewith. A NOR gate 6 is connected to the cancel signal input circuit 3 and the reset signal generator circuit 5 respectively with input terminals thereof. A D.F.F. 7 constitutes a latch circuit and thereby a D input terminal (D terminal) is pulled up by means of a pull up resistor 8, a reset terminal (R terminal) is connected to an output terminal of the NOR gate 6, a clock terminal (CL terminal) is connected to the command signal input circuit 2, a set terminal (S terminal) is grounded, and a positive logical output terminal (Q terminal) is connected to a base of a transistor 9 having a grounded emitter. A base of transistor 12, an emitter of which is connected to a DC power source 11, is connected to a collector of the transistor 9 through a base resistor 10. A first solenoid valve 13 and a second solenoid valve 14 together constitute a driving part for the well known vacuum actuator (FIG. 3) which drives a throttle valve installed in an intake manifold of an engine for the control of the traveling speed of a motor vehicle. A negative pressure is introduced into the vacuum actuator from a negative pressure source of the engine (not shown) when the solenoid valve 13 is energized (ON) and an atmospheric pressure is introduced into the vacuum actuator when the solenoid valve 14 is energized (ON). Other than the above both inlets are closed. Coils 13a and 14a are solenoid coils for the first solenoid 13 and the second solenoid 14, respectively, and one end of each solenoid coil is connected in common to the collector of the transistor 12. The other end of each solenoid coil is connected respectively to each collector of emitter grounded transistors 15, 16. A microcomputer 17 is provided for the control of the traveling speed of a motor vehicle and comprises an input circuit, an output circuit, a CPU. a RAM. a ROM as well as an oscillator for oscillating a watch dog signal. The input circuit of the microcomputer 17 is connected to the outputs of the circuit designated by 1. 2. 3 and 5 and the output circuit thereof is connected to the watch dog signal processing circuit 4 and each base of the transistors 15 and 16. A power supply control circuit 18 for controlling the power supply to the vacuum actuator in an ON and OFF manner corresponding to the kinds of input signals is constituted of circuit elements designated by numerals 6–10 and 12 as shown in the drawing.

In operation, a constant speed traveling mode is not set in a normal traveling motor vehicle and the motor vehicle speed governor is in a cancel mode as the D.F.F 7 has been reset. Under such condition, both transistors 9 and 12 are OFF and the first and second solenoid coils 13a, 14a are disconnected from the power source 11 since the Q terminal of the D.F.F. 7 remains at a low "L" level. When the speed governor traveling mode is selected by a vehicle driver, a command signal having a rise edge is generated at the command signal input circuit 2 and is fed to the CL terminal of the D.F.F. 7 for the setting thereof since the D terminal is at a high "H" level as it is pulled up by means of the resistor 8. Thus the terminal is brought to a high "H" level for rendering the transistor 9 ON and in turn the transistor 12 ON in a successive manner. With this conduction of the transistor 12, the first and second solenoid coils 13a. 14a are connected to the power source 11.

Operation of the microcomputer 17 will now be described. The microcomputer 17 is brought into a control mode for constant speed travel upon receipt of the command signal from the command signal input circuit 2 and controls transistors 15 16 to turn ON and OFF based on an input signal from the speed signal generating circuit 1. The first solenoid coil 13a will be energized if the transistor 15 is turned ON and the second solenoid coil 14a will be energized if the transistor 16 is turned ON and both solenoid coils are not energized other than the above. An opening of the throttle valve is adjusted by the ON/OFF status of the first and second solenoid valves 13, 14 for providing the control of the traveling speed. The microcomputer 17 also feeds, in the duration of operation, a watch dog signal having a predetermined pulse repetition rate to the watch dog signal processing circuit 4. The watch dog signal is then differentiated, rectified and reversed in polarity at the watch dog signal processing circuit 4. An output of the watch dog signal processing circuit 4 is fed to the reset signal generator circuit 5. The reversed signal is then integrated and compared with a signal having a predetermined level at the reset signal generator circuit 5. An output of the reset signal generator circuit 5 is unchanged if the integrated signal is at or below the predetermined level. However, the output of reset signal generator circuit 5 is changed from the "H" level to a "L" level if the integrated signal exceeds the predetermined level due to the absence of the watch dog signal and is used as a reset signal. The NOR gate 6 resets the D.F.F. 7, the S terminal of which is grounded, with the change of output from a low "L" level to a high "H"

level when either of the reset signal from the reset signal generator circuit 5 or a cancel signal from the cancel signal input circuit 3 which is generated by the operation of a driver is fed to the input thereof. With this reset, the Q terminal of the D.F.F. 7 goes to an initial low "L" level for disconnecting the first and second solenoid coils 13a. 14a from the power source 11.

The reset signal from the reset signal generator circuit 5 is also fed to the microcomputer 17 for resetting and in turn the operation of the microcomputer 17 is ceased. Further, when the cancel signal is generated at the cancel signal input circuit 3, the cancel signal is also fed to the microcomputer 17 for canceling the constant speed control and the microcomputer 17 is brought to a standby condition for a next command signal input after ceasing the operation thereof.

As it has been described above according to this preferred embodiment of the present invention, the operation of the Vacuum actuator can be stopped reliably with such an arrangement that the power supply to the actuator is controlled to turn OFF when the reset signal is generated through the absence of the watch dog signal and a safe and highly reliable fail-safe device is provided for motor vehicle speed governors.

Figure 5:
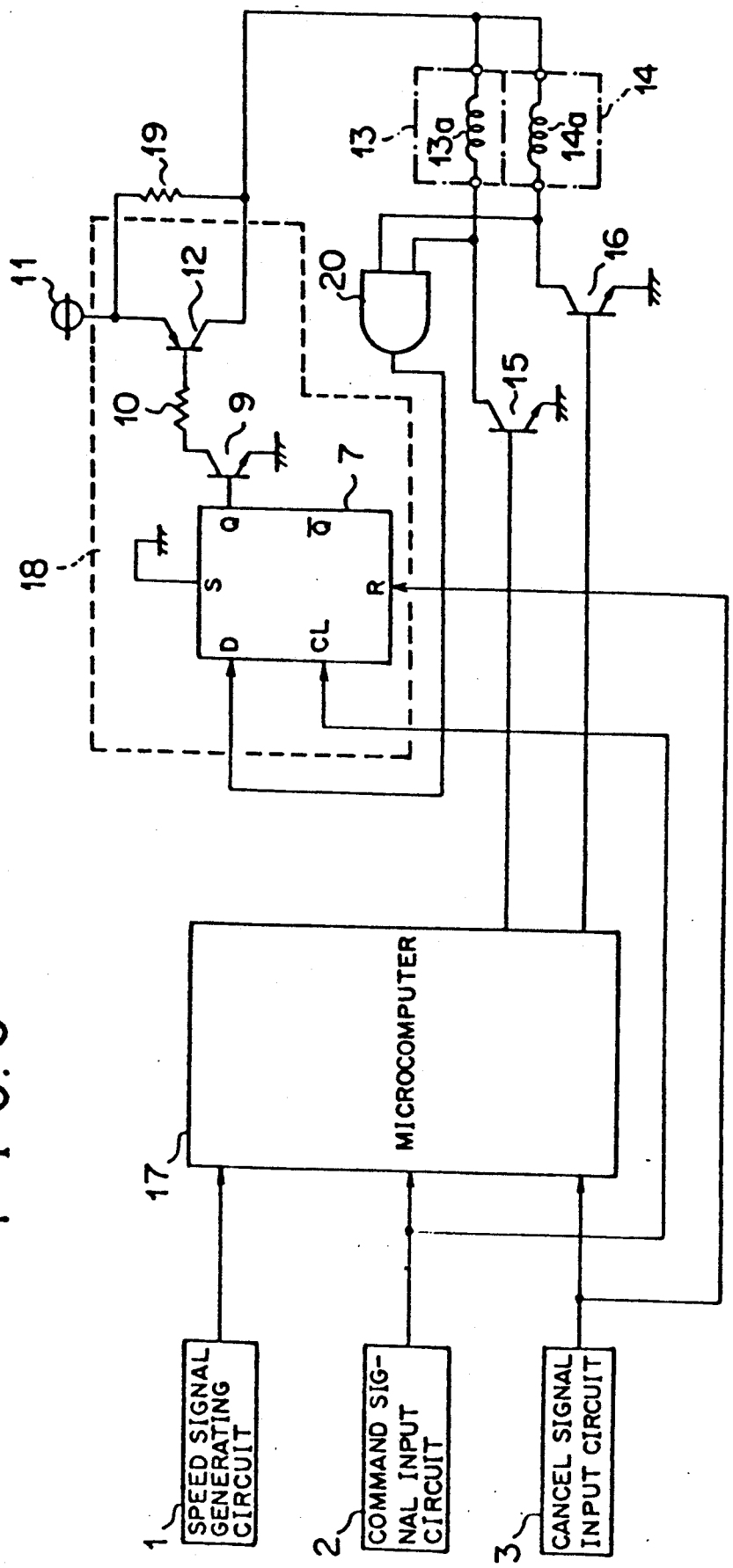
FIG. 5 is a block diagram showing a fail-safe device for a motor vehicle speed governor in accordance with another embodiment of the invention.

Another preferred embodiment of the present invention will now be described with reference to FIG. 5. In FIG. 5, the numerals 1-3, 7 and 9-18 identify the same or like elements shown in FIG. 4. In this embodiment of the invention, an AND gate 20 is provided which is connected to intersections of the first solenoid coil 13a and the transistor 15 and the second solenoid coil 14a and the transistor 16 at input terminals and to the D terminal of the D.F.F. 7 at an output terminal. A resistor 19 interposed between a collector and an emitter of the transistor 12 is a pull up resistor having a high resistance value and a current that flows through this resistor is not capable of energizing (ON) the first and second solenoid valve 13 14 to operate. In this preferred embodiment, the power supply control circuit 18 is constituted of circuit elements designated by 7. 9. 10 and 12 shown in the drawing.

In operation when the setting of the constant speed traveling has been canceled for non-constant speed traveling the D.F.F. 7 is at the reset position and is making the transistor 12 OFF. In this mode of operation the microcomputer 17 turns the transistor 15 and 16 OFF and an output of the AND gate 20 is at a high "H" level since both inputs thereof are pulled up by the resistor 19 to a high "H" level of the DC power source 11 through the solenoid coils 13a. 14a. The high "H" output level of the AND gate 20 is fed to the D terminal of the D.F.F. 7 for keeping the D terminal at the high "H" level. Therefore, upon generation of a command signal from the command signal input circuit 2 through the operation of the driver, the D.F.F. 7 receives the command signal at the CL terminal and the D.F.F. 7 is brought to a set position for rendering the transistor 12 ON. Afterwards, if a cancel signal is generated through the operation of the cancel signal input circuit 3 and if this cancel signal is fed to the R terminal of the D.F.F. 7 the S terminal of which is grounded, the D.F.F. 7 will be brought back to the reset position.

If a runaway or malfunction of the microcomputer 17 or a shortage between the collector and the emitter of either of the transistors 15 or 16 caused by a breakdown thereof takes place while the D.F.F. 7 is at the reset position, a low "L" level will be fed to the AND gate 20. An output of the AND gate then goes to a low "L" level and is fed to the D terminal of the D.F.F. 7. Therefore, even if a command signal is generated at the command signal input circuit 2 and the generated command signal is fed to the CL terminal of the D.F.F. 7, the D.F.F. 7 will remain at the reset position. Accordingly, the transistor 12 is kept OFF and currents that flow through the first and second solenoid coils 13a, 14a are kept below the threshold value for maintaining the safety of the traveling vehicle.

The rest of the operation of this embodiment is the same as that of the embodiment described with reference to FIG. 4, hence no further description will be made.

It is obvious to those who are skilled in the art that AND gate 20 may be substituted by an OR gate. However, in this case, the D.F.F. 7 is prohibited from setting constant speed traveling only when both transistors 15 and 16 are shorted between the collectors and the emitters thereof.

As has been described above, in accordance with this invention, there will be no runaway of a vehicle and the safety of traveling is assured provided that the power supply to the actuator is forced to cut OFF even if a command signal is generated at the command signal input circuit 2 under such circumstances as the switching elements for controlling the actuator being rendered to conduct in the duration of the constant speed traveling being canceled.

Still another preferred embodiment of the present invention will be described with reference to FIG. 6. The numerals 1-3 and 7-17 identify the same or like elements shown in FIG. 4, however, the microcomputer 17 is illustrated more specifically in FIG. 6. In this preferred embodiment, input terminals of an OR gate 21 are connected to the cancel signal input circuit 3 and the microcomputer 17. The microcomputer 17 comprises an input circuit 17a for processing input signals, a ROM 17b for storing a program to execute steps such as those shown in a flowchart in FIG. 7, a RAM 17c as a work memory, a CPU 17d for executing various decisions and operations and an output circuit 17e for processing output signals. The input circuit 17a is connected to the elements or the circuits designated by the numerals 1-3 and an inverted terminal ($\overline{Q}$ terminal) of the D.F.F. 7. The output circuit 17 is connected to one of the input terminals of the OR gate 21 and bases of the transistors 15. 16.

Operation of the embodiment shown in FIG. 6 will be described more in detail. When a rising command signal is generated at the command signal input circuit 2, the D.F.F. 7 is set upon receipt of the generated command signal at the CL terminal thereof. The transistor 9 is rendered ON since the Q terminal of the D.F.F. 7 goes to a high "H" level by the setting and, in turn, the transistor 12 is rendered ON. This turning ON of the transistor 12 eventually connects the power source 11 with the solenoid coils 13a. 14a. Solenoids 13 and 14 are, in turn. interrupted in excitation for the constant speed traveling by switching the transistors 15. 16 ON and OFF under the control of the microcomputer 17. The D.F.F. 7 is reset upon receipt of a high "H" level signal at the R terminal being fed through the OR gate when a cancel signal is generated at the cancel signal input circuit 3. On the other hand, the microcomputer 17 also derives a high "H" level reset signal therefrom for resetting the D.F.F. 7 upon receipt of the cancel signal from the cancel signal input circuit 3 and keeps on deriving the reset signal therefrom until the change of the level at the $\overline{Q}$ terminal from a low "L" level to a high "H" level is detected. That is, the microcomputer 17 keeps on deriving the high "H" level reset signal therefrom through the OR gate to the R terminal of the D.F.F. 7 until the reset of the D.F.F. 7 is detected through the output of the $\overline{Q}$ terminal of the D.F.F. 7. When the Q terminal of the D.F.F. 7 goes to a low "L" level by the resetting thereof, the transistor 12 is turned OFF for disconnecting the power source 11 from the solenoid coils 13a, 14a.

Operation of the microcomputer 17 will be described more specifically with reference to FIG. 7. When electric power is supplied from an electric source (not shown). the microcomputer 17 starts the processing shown in a flowchart of FIG. 7. An initial setting for a main routine is executed at step 101 by clearing the contents of RAM 17c. A true vehicle speed Vs is calculated at step 102 from a measured period of output pulses of the speed signal generating circuit 1. An output of the command signal input circuit 2 and an output at the $\overline{Q}$ terminal of the D.F.F. 7 are fed to the input circuit 17a at step 103. An output of the cancel signal input circuit 3 is fed to the input circuit 17a at step 104. It is decided at step 105 whether or not the calculated true vehicle speed Vs is at or above a speed of 40 km/h. If it is at or above the 40 km/h speed, the program will proceed to step 106 for deciding whether the cancel signal has been fed to the input circuit 17a at the step 104 or not. If the cancel signal has not been fed at the step 104, the program will proceed to step 107 for discriminating a state of a set enable flag which designates an existence of probability of the constant speed travel setting. When the set enable flag is discriminated as "0" for not permitting the setting of the constant speed traveling the program proceeds to step 108 for deciding whether an output at the $\overline{Q}$ terminal of the D.F.F. 7 is at a high "H" level or not. If it is decided that the $\overline{Q}$ terminal is at the high "H" level, the set enable flag is set to "1" in the RAM 17c at step 109 for indicating a status that the setting of the constant speed traveling is possible since the D.F.F. 7 is at the reset position. In any of the following cases when the true vehicle speed Vs is determined to be below the speed of 40 km/h at the step 105, when it is decided that the cancel signal is fed to the input circuit 17a at the step 106 and when the $\overline{Q}$ terminal of the D.F.F. 7 is decided at the high "H" level for indicating the resetting thereof at the step 108 the program proceeds to step 110 thereby the set enable flag is set to "0" as well as a constant speed traveling flag for indicating an existence of the constant speed control mode is set to "0". If it is discriminated at the step 107 that the set enable flag is "1". the program proceeds to step 111 where a state of the constant speed traveling flag is discriminated. When "0" is discriminated at the step 111, it is decided at step 112 Whether or not the rising command signal is fed to the input circuit 17a and, if it is YES, the true vehicle speed Vs is stored into the RAM 17c as a target speed Vr and the constant speed traveling flag is set to "1" at step 113. The program proceeds to step 114 when "1" is discriminated at the step 111 for indicating the constant speed travel mode when it is decided that the command signal has not been fed to the input circuit 17a at the step 112 when the process at the step 109 is executed, when the process at the step 110 is executed and when the process at the step 113 is executed and when the process at the step 113 is executed. A state of the set enable flag is discriminated at the step 114. If "0" is discriminated, the program proceeds to step 115 and a high "H" level reset signal is derived therefrom to the R terminal of the D.F.F. 7 through the OR gate 4. If "1" is discriminated the program proceeds to step 116 and a low "L" signal is derived therefrom instead of the high level reset signal. A state of the constant speed traveling is discriminated at step 117, thereby if it is "0" the program will return to the step 102 after a predetermined period of time. If it is "1". the program will proceed to step 118. An amount of control is calculated at step 118 from the true vehicle speed Vs and the target speed Vr and the result is fed as a pulse output respectively to the transistors 15. 16 for providing the ON/OFF control of the solenoids 13 and 14. The program proceeds to step 120 for elapsing a predetermined period of time after executing the process at the step 119 and returns to the step 102 after executing the process at the step 120 for repeating the above described steps.

Still another embodiment of the present invention will be described with reference to a flowchart of FIG. 8, the block diagram of which is the same as that of the embodiment shown in FIG. 6 and FIG. 7 except for a program to be stored in the ROM 17b. In accordance with this embodiment of the present invention, a high "H" level reset signal is provided from the computer 17 to the R terminal of the D.F.F. 7 through the OR gate when a level at the $\overline{Q}$ terminal of the D.F.F. 7 is changed from a high "H" level to a low "L" level and the D.F.F. 7 is discriminated as being set notwithstanding the fact that no command signal has been fed from the command signal input circuit 2 at the time of a non-constant speed traveling mode. Accordingly, the D.F.F. 7 is reset with this high "H" level reset signal and the set of the constant speed traveling mode is canceled.

Operation of the microcomputer 17 will be described more specifically with reference to the flowchart of FIG. 8. Referring now to FIG. 8, there is shown a main routine implemented by the microcomputer 17 and associated circuits of FIG. 6. The microcomputer 17 is initialized at step 201 and goes through the following steps. A true vehicle speed Vs is calculated at step 202. A command signal is fed from the command signal input circuit 2 and an output is fed from the $\overline{Q}$ terminal of the D.F.F. 7 at step 203. A cancel signal is fed from the cancel signal input circuit 3 at step 204. It is decided at step 205 whether or not the true vehicle speed Vs is at or above 40 km/h. If it is at or above 40 km/h, it is discriminated at step 206 whether or not a cancel signal has been fed. If it has not, a state of a set enable flag is discriminated at step 207. If the set enable flag is discriminated as "0", it is changed to "1" at step 208. If the set enable flag is discriminated as "1", the program proceeds to step 209 whereby a state of a constant speed traveling flag is discriminated. If "0" is discriminated, since it is not the state of constant speed traveling mode, it is decided at step 210 whether or not a rising command signal has been fed from the command signal input circuit 2. If it has, the true vehicle speed Vs is set to a target vehicle speed Vr and the constant speed traveling flag is set to "1" for indicating the state of constant speed traveling mode. If it is decided at the step 210 that the rising command signal has not been fed, it is discriminated at step 212 whether or not an output at the $\overline{Q}$ terminal of the D.F.F. 7 is at a high "H" level. If it is not, it is determined that the D.F.F. 7 has been set in spite of a state of non constant speed traveling mode and the program proceeds to step 213. Further if it is decided at the step 205 that the true vehicle speed is less than 40 km/h or it is discriminated at the step 206 that the cancel signal has been fed, the program also proceeds to the step 213. The set enable flag and the constant speed traveling flag are set to "0" at the step 213. The program proceeds to step 214 when any of the step 208, step 211 and step 213 has executed, when a state has been decided as the constant speed traveling mode at the step 209 by the fact that the constant speed traveling flag is "1" or when an output at the $\overline{Q}$ terminal has been discriminated as a high "H" level at the step 212. A state of the set enable flag is discriminated at step 214. If it is "0", a high "H" level reset signal is fed to the R terminal of the D.F.F. 7 through the OR gate at step 214. If it is "1", a low "L" level is derived therefrom at step 216 without generating the reset signal. Steps 217–220 are the same as the steps 117–120 in the flowchart shown in FIG. 7 and no description will be given for these steps.

Although the negative pressure type actuator has been used in the preferred embodiments of the present invention as described above the actuator is not limited to the negative pressure type, but instead, a motor drive type actuator comprised of a DC motor and an eletromagnetic clutch may also be utilized to actuate the throttle valve.

Figure 6:
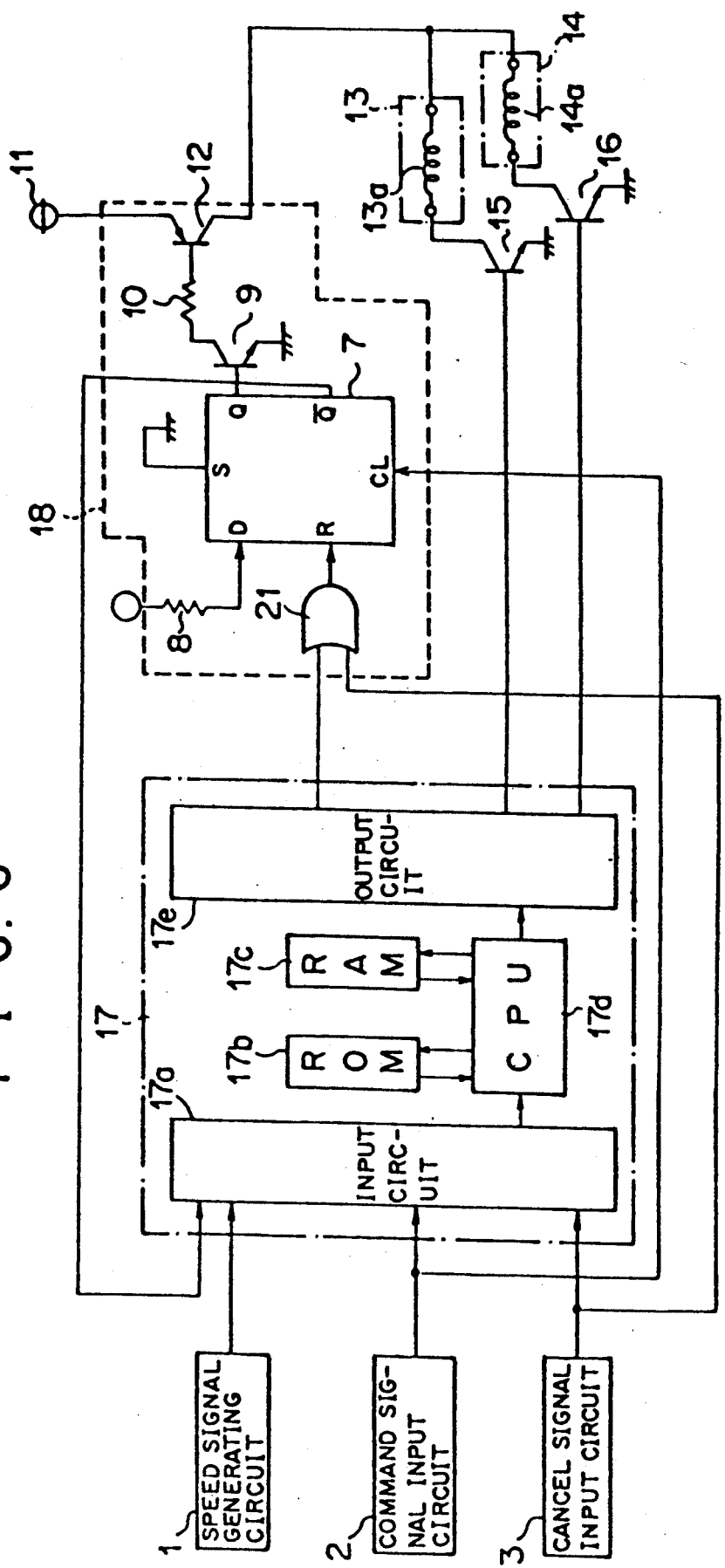
FIG. 6 is a block diagram showing a fail-safe device for a motor vehicle speed governor in accordance with another embodiment of the invention.
Figure 7:
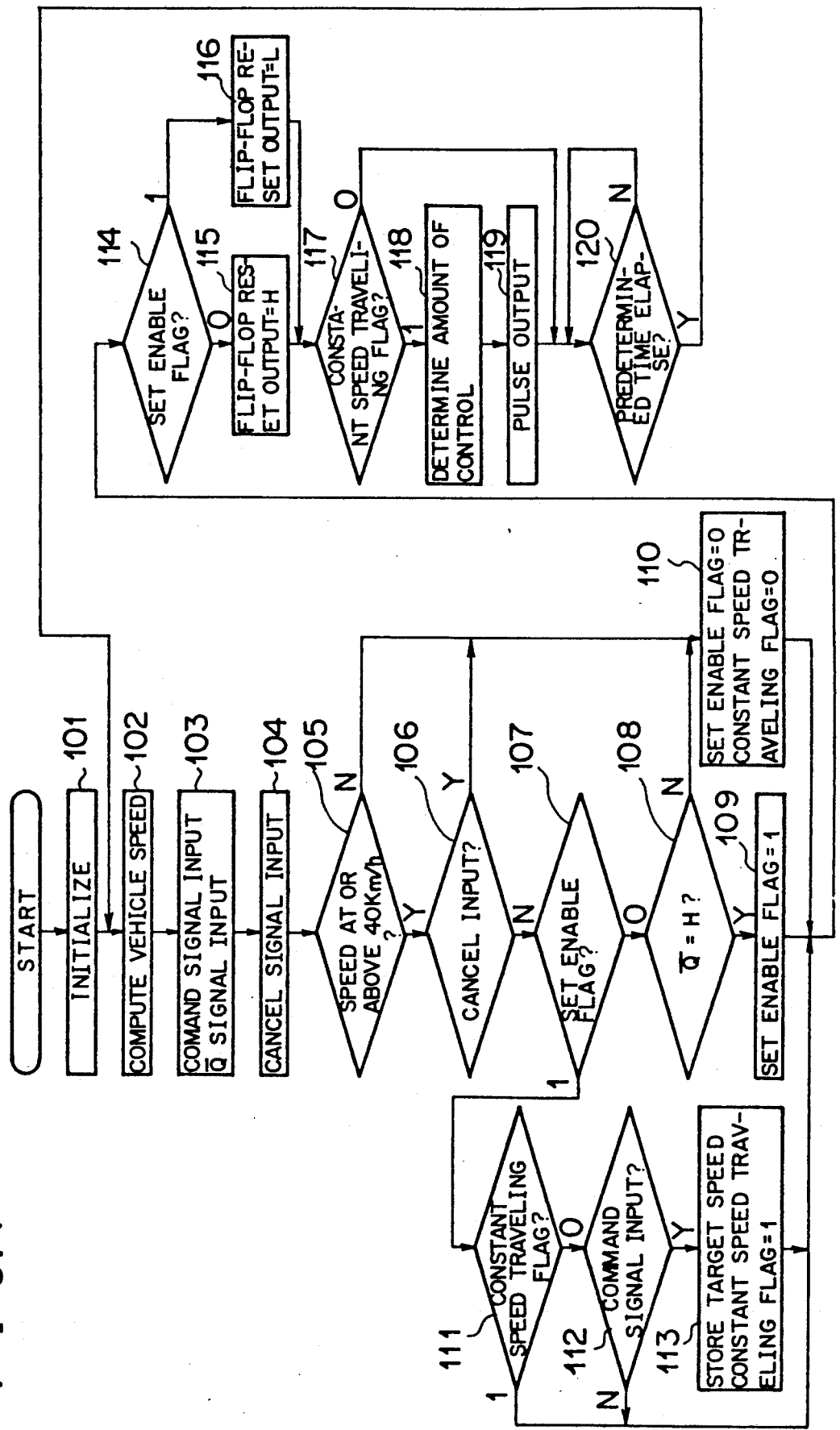
FIG. 7 is a flow chart showing the operation of the microcomputer in the circuit diagram shown in FIG. 6.
Figure 8:
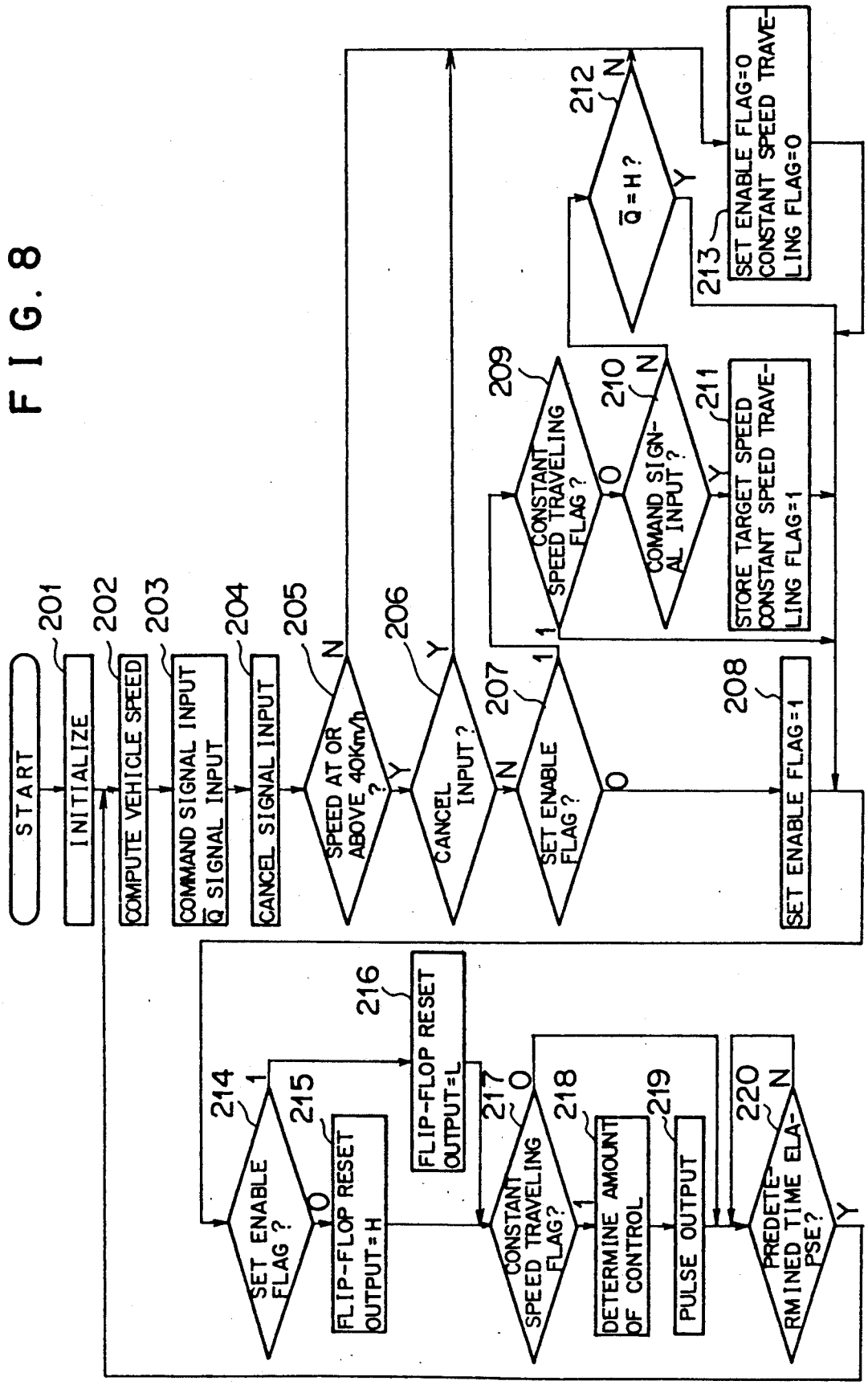
FIG. 8 is a flowchart showing the operation of the microcomputer in another embodiment of the invention.

As it has been described above, in accordance with the specific embodiments of the present invention shown in FIG. 6 through FIG. 8, since the reset signal is provided by the microcomputer to the latch circuit until the latch circuit is set to the second output generating status after detecting an output generating status of the latch circuit which controls the actuator by turning ON and OFF depending on the first and second output generating status thereof or the reset signal is derived from the microcomputer to set the latch circuit to become the second output generating status when the latch circuit is turned to the first output generating status in spite of no command signal being generated, the duplicate fail-safe system for the constant speed traveling of the vehicle is effective and safety is provided in the vehicle travel.

While the present invention has been described in detail with reference to the preferred embodiments it should be apparent to those skilled in the art that various modifications can be made without departing from the spirit and scope of the invention. Accordingly, the invention is not to be limited except as by the appended claims.

What is claimed is:

1. A fail-safe device for a motor vehicle speed governor comprising:
   command signal input means for generating a command signal to direct a constant speed traveling to be set from external operation;
   cancel signal input means for generating a cancel signal which is independent of said command signal to direct the constant speed traveling to be canceled from external operation;
   latch means to be set to a first output generating status in response to the command signal and reset to a second output generating status in response to at least one of the cancel signal and a reset signal;
   power control means for controlling a power supply to an actuator, which drives a throttle vale in an intake manifold of an engine under the control of switching means for the constant speed traveling, so as to turn ON when the latch means is at the first output generating status and to turn OFF when the latch means is at the second output generating status; and
   reset means for generating the reset signal to reset the latch means upon an occurrence of a malfunction in the control of the constant speed traveling.

2. A fail-safe device for a motor vehicle speed governor as defined in claim 1, further comprising:
   means for generating a watch dog signal consisting of a series of pulses;
   wherein the reset means generates the reset signal upon a ceasing of generation of the watch dog signal.

3. A fail-safe device for a motor vehicle speed governor as defined in claim 1, further comprising:
   means for controlling the switching means to turn the power supplied to the actuator ON and OFF;
   detecting means for detecting a state of conduction of the switching means to derive a detected output; and
   means for prohibiting the latch means from setting to the first output generating status upon receipt of the command signal if the latch means is reset to the second output generating status by the cancel signal and the detected output of the detecting means is fed thereto.

4. A fail-safe device for a motor vehicle speed governor as defined in claim 3, wherein said detecting means is an AND gate being connected to the switching means at inputs and to the latch means at an output thereof.

5. A fail-safe device for a motor vehicle speed governor as defined in claim 3, wherein the detecting means is an OR gate connected to the switching means at inputs and to the latch means at an output thereof.

6. A fail-safe device for a motor vehicle speed governor as defined in claim 1, further comprising:
   detecting means for detecting the second output generating status of the latch means;
   wherein the reset means for generating the reset signal continues to generate the reset signal after the cancel signal is fed thereto until a detected signal from the detecting means is received.

7. A fail-safe device for a motor vehicle speed governor as defined in claim 1, further comprising:
   detecting means for detecting the first output generating status of the latch means;
   wherein the reset means for generating the reset signal generates the reset signal when a detected signal from the detecting means is fed thereto and when no command signal is being received.

8. A fail-safe device for a motor vehicle speed governor as defined in one of the preceding claims, wherein the latch means comprises a D flip-flop circuit.

9. A fail-safe device for a motor vehicle speed governor as defined in claim 1, wherein the power control means comprises transistors which receive a first output of the latch means.

10. A fail-safe device for a motor vehicle speed governor as defined in claim 1, wherein the switching means comprises transistors connected to the actuator.

11. A fail-safe device for a motor vehicle speed governor as defined in claim 1, wherein the actuator is a negative pressure type actuator comprised of solenoid coils.

12. A fail-safe device for a motor vehicle speed governor as defined in claim 1, wherein the actuator is a motor drive type actuator comprised of a DC motor and an electromagnetic clutch.

* * * * *